United States Patent Office 3,356,492
Patented Dec. 5, 1967

3,356,492
METHOD OF REMOTE STARTING OF EXOTHERMIC CHEMICAL REACTIONS FOR THE PRODUCTION OF URANIUM
Maurice Delange, Ballancourt, and Henri Huet, Le-Verger-Saint-Vrain, France, assignors to Commissariat à l'Energie Atomique, Paris, France
Original application Apr. 27, 1959, Ser. No. 809,294. Divided and this application July 22, 1965, Ser. No. 482,976
Claims priority, application France, May 2, 1958, 764,605
1 Claim. (Cl. 75—84.1)

ABSTRACT OF THE DISCLOSURE

Metallic uranium is obtained by chemical reaction from a reaction mixture of uranium tetrafluoride in a vessel under an inert atmosphere by detonating and shooting a mixture of uranium tetrafluoride and an alkaline or earth-alkaline peroxide into the reaction mixture.

---

Figure 1:
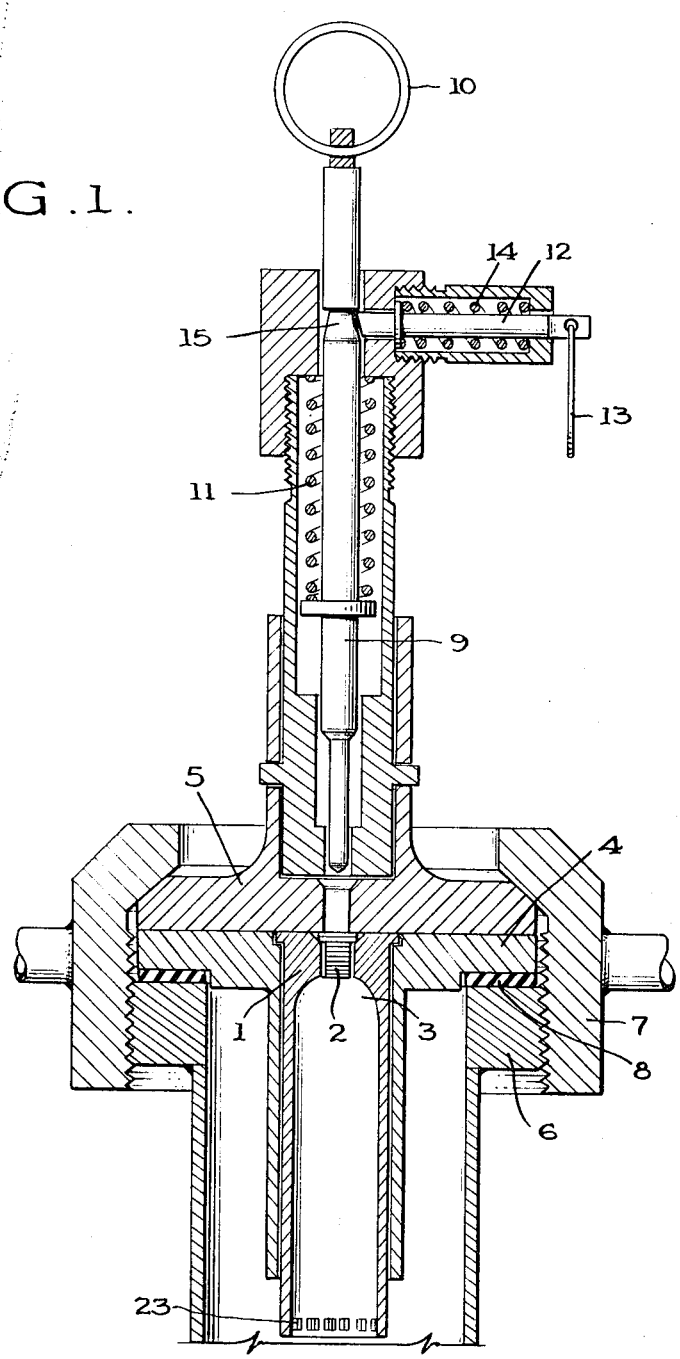

This application for patent is a division of our application for patent Ser. No. 809,294 filed Apr. 27, 1959, and now abandoned for Method and Means for Remote Starting of Exothermic Chemical Reactions.

The present invention relates to a method of and means for remote starting of exothermic chemical reactions.

Such reactions have hitherto been started in the following manner:

For a discontinous process, for example in aluminothermy there is disposed at the top of the body of reaction material a small quantity of a highly oxidizing compound such as sodium dioxide or barium dioxide, mixed more or less thoroughly with a small portion of the reaction material, previously pulverized, and the mixture is thereafter ignited.

This method is satisfactory when the reaction takes place in air; in effect, to ignite the mixture it is sufficient to bring the flame of a blow-pipe or a blow-torch close to the oxygenated composition.

However, when the reaction must take place in a closed vessel, for example, in a bell-shaped container, and more particularly in an inert atmosphere such as argon, or in a vacuum or at reduced pressure, starting of the reaction presents several difficulties.

In effect, an inert gas does not support combustion and it is impossible to use a flame.

This disadvantage can be overcome in part by using an electric ignition device, consisting of two electrodes connected by a resistance which extends into the upper part of the main reaction mixture. But it is then necessary, in a preliminary operation, to prepare a starting mixture designed to set going the reaction upon contact with the electrodes. This operation makes it necessary to provide, in addition to the usual conduit for the introduction of the reaction mixture, a supplementary tube of fairly large size at the top of the bell, to introduce the starting mixture and to suitably locate it between the heated resistance and the reaction mixture; this for example, necessitates a water-cooled tight joint for the cover which closes this conduit.

When carrying out continuous reactions and in the absence of air, for example, for a combustion reaction in a combustion chamber between solid fuel and a solid or liquid body acting as support for the combustive, the refractory walls of the combustion chamber are heated to such a temperature that, under the then resulting pressure, the components of the mixture of fuel and combustive start to react; this heating step is effected by means of a starting mixture, for example a mixture of magnesium nitrate, magnesium and aluminum, producing heat under the sole action of a detonating primer or an electric spark; to this end there is generally used a container of fusible and combustible material, filled with the starting mixture. The container forms in the interior of the combustion chamber a temporary compartment, since the material of which it is made (envelope and container) disappears due to combustion.

Even though the introduction of the container is in principle carried out only once, since the reaction is continuous, this method presents the same drawbacks as that used when the reaction is not continuous; it is necessary to prepare and to introduce, into the vessel in which the exothermic reaction takes place, the starting mixture, sometimes in substantial quantities, and it is necessary to provide to this end in the vessel a special opening of fairly large dimensions to introduce the starting mixture and eventually its container, and to locate the mechanical element for the detonation or the electric element to ignite the mixture.

In either the continuous or the discontinuous processes, there is further the disadvantage of introducing into the reaction mixture impurities in quantities which are difficult to control, these impurities deriving from the different elements of the starting device (detonating primer or filament, starting mixture, container).

The present invention relates to a method of and to a device for remote starting of exothermic chemical reactions.

The method is characterized in that after igniting, at a point remote from the body of reaction mixture, a small portion of the latter, eventually combined with a product facilitating ignition, said portion is shot into the body of the reaction mixture; both steps may be effected by means of a device which comprises a cartridge similar to a hunting cartridge, but filled with the above mentioned portion, ignition being carried out by percussion on the detonator of the cartridge.

In a preferred embodiment of the device according to the invention, the case of the cartridge, which is made of a suitable metal, for example, stainless steel, has a calibrated hole in its base. In this hole is forced a closed detonator, of the type used for guns or revolvers, of mercury fulminate or of lead trinitroresorcinate. The interior of the cartridge case is filled with the reaction mixture to which has been added a little sodium dioxide. Ignition is effected by a spring-actuated striker. The device is mounted on a tube projecting from the closed vessel containing the mixture to be reacted.

To start the reaction, it is sufficient, after having produced a vacuum in the vessel, and/or after having filled it with an inert atmosphere, to tension, then to release, the spring of the striker.

Such a device is very simple, since it only requires a fairly thin tube at the top of the closed vessel, and the cartridge is easy to prepare and put in position.

Furthermore, the precise proportioning of the constituent of the reaction mixture portion, makes it possible to reduce to the minimum the quantity of sodium dioxide, or of similar compounds adapted to transmit the action of the closed detonator, for example alkali or earth alkali peroxide or certain nitrates, to be added to the portion. Such compounds are selected according to the nature of the reaction mixture. Furthermore, since the starting device remains sealed after percussion due to the use of a closed detonator, there is no disturbance of the conditions in which the reaction takes place.

The method is particularly suitable for starting the reaction of treatment of metallic uranium by calciothermy of uranium tetrafluoride, the products apt to pollute the metal being of very small quantity and furthermore not being neutron absorbing.

Figure 2:
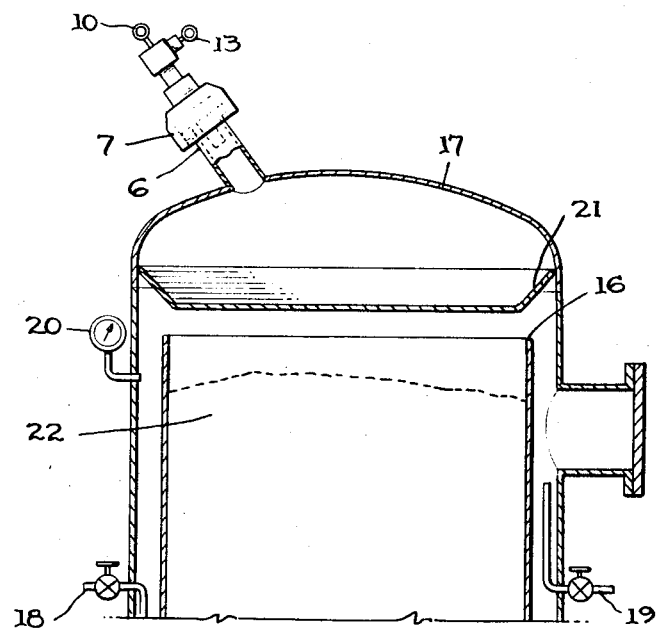

An embodiment of the invention is illustrated by way of example in the accompanying drawings, wherein:

FIGURE 1 shows in axial section a starting device according to the invention; and FIGURE 2 shows, schematically, and in section, a furnace provided with the starting device of FIGURE 1.

FIGURE 1 shows case 1 of the cartridge, of stainless steel, with a closed detonator 2, of mercury fulminate or lead trinitroresorcinate, and containing the reaction mixture 3, a support 4 for the case 1, and a support 5 for the percussion mechanism. The supports 4 and 5 are fixed on a tube 6 by means of a cap nut 7 which is screwed on a thread of the tube 6; tightness is ensured by a packing 8.

The percussion mechanism, shown in FIGURE 1 in cocked position, comprises a striker 9, having at its end a cocking ring 10, and a spring 11 which, when the striker 9 is released, projects the same onto the detonator 2.

The striker 9 is maintained in cocked position by a pin 12, provided with an actuating ring 13, said pin 12 engaging a notch 15 of striker 9, under the action of spring 14.

FIGURE 2 shows in section a furnace having a crucible 16, covered by a bell 17, from which projects a tube 6, in which is mounted the starting device shown in FIGURE 1; the furnace comprises a conduit 18 connected to a vacuum pump (not shown), a conduit 19 for introducing argon, a vacuum gauge 20, a deflector 21 consisting of a lateral frusto-conical surface which adjusts itself against the walls of bell 17 so as to avoid, during the reaction in the body of the reaction mixture 22, the splashing of material into the space between the crucible 16 and the walls of the furnace.

The device operates as follows:

The cartridge case 1, provided with its closed detonator 2, is filled with reaction mixture 3, the latter being prevented from falling out by closing the case 1 with a lid 23 of pure aluminum or magnesium.

The cartidge thus prepared is placed in the support 4, and then the percussion mechanism, in un-cocked position is placed thereon, and the assembly is fixed on the tube 6.

The furnace is evacuated through conduit 18, and is then placed under partial pressure of argon. The percussion mechanism is cocked by pulling on the ring 10 of striker 9 until the notch 15 is engaged by the pin 12.

To fire the mechanism, the ring 13 of pin 12 is pulled; this releases the striker 9, which under the action of spring 11 strikes the closed detonator 2; under the percussion the fulminate detonates and ignites the reaction mixture 3, projecting the same into the crucible 16, the reaction started in the starting device then continues in the crucible 16. The furnace remains sealed since the detonator 2 is not traversed by the striker, a simple percussion being sufficient to detonate the mercury fulminate.

The embodiment of the invention which has been illustrated and described is given merely by way of example, and various modifications are possible within the scope of the appended claim.

The embodiments of the invention in which an exclusive property or privilege is claimed are defined as follows:

A method of remote starting of exothermic chemical reaction for preparing metallic uranium comprising the steps of mixing a small portion of a reaction mixture of uranium tetrafluoride with a small quantity of an alkaline or earth-alkaline peroxide, placing said small portion in a detonator, placing a reaction mixture of uranium tetrafluoride in a vessel, providing an inert atmosphere or vacuum in the vessel over the reaction mixture and then both igniting the small portion of reaction mixture in the vessel and shooting the ignited portion into the reaction mixture in the vessel by detonation of said detonator into the vessel.

References Cited

UNITED STATES PATENTS

| | | | |
|---|---|---|---|
| 2,925,038 | 2/1960 | Walker | 102—23 |
| 3,002,816 | 10/1961 | Friend et al. | 23—1 |
| 3,004,822 | 10/1961 | Poorman et al. | 23—1 |
| 3,038,530 | 6/1962 | Fowler | 89—1 X |

CARL D. QUARFORTH, *Primary Examiner.*

BENJAMIN R. PADGETT, *Examiner.*

M. J. SCOLNICK, *Assistant Examiner.*